United States Patent
Tongprasit et al.

(10) Patent No.: US 9,098,744 B2
(45) Date of Patent: Aug. 4, 2015

(54) POSITION ESTIMATION DEVICE, POSITION ESTIMATION METHOD, AND PROGRAM

(75) Inventors: Noppharit Tongprasit, Tokyo (JP); Aram Kawewong, Tokyo (JP); Osamu Hasegawa, Tokyo (JP)

(73) Assignee: Tokyo Institute of Technology, Tokyo (JP)

( * ) Notice: Subject to any disclaimer, the term of this patent is extended or adjusted under 35 U.S.C. 154(b) by 325 days.

(21) Appl. No.: 13/698,572

(22) PCT Filed: Feb. 10, 2011

(86) PCT No.: PCT/JP2011/000749
§ 371 (c)(1),
(2), (4) Date: Jan. 18, 2013

(87) PCT Pub. No.: WO2011/145239
PCT Pub. Date: Nov. 24, 2011

(65) Prior Publication Data
US 2013/0108172 A1 May 2, 2013

(30) Foreign Application Priority Data
May 19, 2010 (JP) ................................. 2010-115307

(51) Int. Cl.
G06K 9/48 (2006.01)
G06K 9/00 (2006.01)
G06T 7/00 (2006.01)

(52) U.S. Cl.
CPC ........ *G06K 9/00624* (2013.01); *G06K 9/00664* (2013.01); *G06T 7/0042* (2013.01)

(58) Field of Classification Search
USPC ......... 382/156, 157, 209, 218, 278, 291, 171, 382/190, 216, 282; 348/116, 161
See application file for complete search history.

(56) References Cited

U.S. PATENT DOCUMENTS 6,088,469 A * 7/2000 Fukumura et al. ............. 382/103
6,957,712 B2 * 10/2005 Song et al. ..................... 180/167

(Continued)

FOREIGN PATENT DOCUMENTS

| JP | 2002-48513 A | 2/2002 |
| JP | 2008-304268 A | 12/2008 |
| JP | 2010-238008 A | 10/2010 |

OTHER PUBLICATIONS

International Search Report mailed Mar. 8, 2011, as issued in corresponding International Application No. PCT/JP2011/000749, filed Feb. 10, 2011.

*Primary Examiner* — Yosef Kassa
(74) *Attorney, Agent, or Firm* — Maier & Maier, PLLC

(57) ABSTRACT

Disclosed is a position estimation device including a feature extraction unit that extracts invariant features from an input image, a matching unit that obtains matching between an input image and a registered place by referring to a database containing each registered place and invariant features in association, a similarity calculation unit that calculates a similarity with inclusion of a registered place near a selected registered place when the matching is a threshold or more, and a position identification unit that identifies the input image as a registered place when the similarity is a threshold or more. The feature extraction unit extracts local features from each input image being sequential images taken sequentially, selects features matched between the sequential images as sequential features, and calculates invariant features based on the sequential features. The number of sequential images is variable depending on the number of matched features.

13 Claims, 6 Drawing Sheets

(56) References Cited

U.S. PATENT DOCUMENTS

| | | | |
|---|---|---|---|
| 7,239,339 B2 * | 7/2007 | Nagai et al. | 348/116 |
| 7,623,685 B2 * | 11/2009 | Boult et al. | 382/115 |
| 7,853,372 B2 * | 12/2010 | Park et al. | 701/23 |
| 8,031,947 B2 * | 10/2011 | Jacobsen | 382/199 |
| 8,054,289 B2 * | 11/2011 | Berkley et al. | 345/156 |
| 8,438,507 B2 * | 5/2013 | Renwick et al. | 716/54 |
| 8,639,262 B2 * | 1/2014 | Holcman | 455/456.1 |
| 8,725,294 B2 * | 5/2014 | Gienger | 700/259 |
| 8,768,071 B2 * | 7/2014 | Tsuchinaga et al. | 382/227 |
| 2001/0055063 A1 | 12/2001 | Nagai et al. | |
| 2008/0304707 A1 | 12/2008 | Oi et al. | |

* cited by examiner

POSITION ESTIMATION DEVICE, POSITION ESTIMATION METHOD, AND PROGRAM

RELATED APPLICATIONS

This is the U.S. national stage application which claims priority under 35 U.S.C. §371 to International Patent Application No.: PCT/JP2011/000749 filed on Feb. 10, 2011, which claims priority to Japanese Patent Application No. 2010-115307 filed on May 19, 2010, the disclosures of which are incorporated by reference herein their entireties.

TECHNICAL FIELD

The present invention relates to a position estimation device, a position estimation method and a program that can be suitably used for a robot device and the like and, particularly, to a position estimation device, a position estimation method and a program that estimate a position using local features.

BACKGROUND ART

The estimation and identification of the self-position is an essential capability for humans and machines. It is always important for robots and computer visions to know where the current position is. Particularly, in a navigation system of a mobile robot, it is a basic demand to keep track of where the current position is.

A position detection device disclosed in Patent Literature 1 is known. The position detection device includes an intensity image acquisition means that acquires an intensity image at the front view of a mobile body, a distance image acquisition means that has the same field of view as the intensity image acquisition means and acquires a distance image at the same time as when the intensity image acquisition means acquires an intensity image, a feature point extraction means that extracts a feature point from each of at least two sequential frames of intensity images, and a reference feature point selection means that calculates a displacement of the position of the feature point extracted by the feature point extraction means between the two frames based on the distance image and selects a reference feature point for calculating the self-position from the displacement.

CITATION LIST

Patent Literature

PTL 1: Japanese Unexamined Patent Application Publication No. 2002-048513

SUMMARY OF INVENTION

Technical Problem

It is very difficult to distinguish whether a place where the current image has been taken is a place where a robot has visited before or a place totally unknown to the robot. Depending on the way of extracting features, there is a case where a totally unknown place is associated with a certain place. In the estimation of a position, the capability to distinguish whether the current position is a place already registered in a database or a new place is significantly important. Further, if the place where the image has been taken can be recognized as a new place, it is possible to expand the DB, that is, to learn a map. The development of a position estimation device suitably mounted on a mobile body, particularly a robot device, is desired. On the other hand, while the memory volume increases as learning progresses, a robot only has limited memory resources, and it is also necessary to prevent a significant increase in memory volume. Further, in order to realize a real-time position recognition, it is necessary to improve the computing speed.

Object of Invention

The present invention has been accomplished to solve the above problems and an object of the present invention is thus to provide a position estimation device, a position estimation method and a program that can recognize whether the current position is an already registered place or an unregistered place.

Solution to Problem

A position estimation, device according to the present invention includes a feature extraction means for extracting invariant features from an input image, a matching means for obtaining matching between an input image and a registered place in reference to a database containing each registered place and invariant features in association with each other, a similarity calculation means for calculating a similarity with inclusion of a registered place near a selected registered place when the matching is equal to or larger than a specified threshold, and a position identification means for identifying the input image as a registered place when the similarity is equal to or higher than a specified threshold. The feature extraction means includes a local feature extraction means for extracting local features from each input image being sequential images taken sequentially, a feature matching means for performing matching of the local features extracted by the local feature extraction means between the sequential input images, a sequential feature selection means for selecting features matched between the sequential images by the feature matching means as sequential features, and an invariant feature calculation means for calculating invariant features based on the sequential features, and the sequential feature selection means sets the number of sequential images to be variable depending on the number of matched features.

In the present invention, the current position is identified by extracting invariant features from an input image being sequential images taken sequentially and performing matching using the features. When extracting the invariant features, the number of sequential images is set variable depending on the number of matched features, thereby allowing the number of invariant features to be changed arbitrarily, so that an appropriate number of invariant features can be set in consideration of the purpose, usage, computing speed and the like.

Further, the matching means may include a common dictionary containing each features registered in association with an index and perform matching by substituting an index for local features of each input image in reference to the common dictionary. Because the features are associated with an index and managed in one common dictionary, the memory volume can be significantly reduced.

Further, the matching means may calculate a matching score based on a product of the number of matches to features registered in the common dictionary and the number of matches to features contained in a matching target image. Because the matching score can be calculated with a simple arithmetical operation, the computing speed can be enhanced.

Furthermore, the similarity calculation means may calculate a first estimated value by assigning a weight to a matching score of the selected registered place and the near registered place, and the identification means may identify whether the place is a registered place using the first estimated value as the similarity. By estimating a position in consideration of the near registered place rather than merely performing matching, the rate of estimation can be improved.

Further, the similarity calculation means may calculate a second estimated value by normalizing the first estimated value, and the identification means may identify whether the place is a registered place using the second estimated value as the similarity. By performing the normalization, false identification can be further prevented and the rate of identification can be improved.

Further, the local features may be SIFT (Scale Invariant Feature Transformation) and/or SURF (Speed Up Robustness Features). Furthermore, not limited to the SIFT or SURF, other local features that are robust to scale or rotation changes, noises and the like may be used. By using those existing local features, the properties of those features are maintained, and they can be extracted and described as features robust to changes in illumination or the like.

A position estimation method according to the present invention includes a feature extraction step of extracting invariant features from an input image, a matching step of obtaining matching between an input image and a registered place in reference to a database containing each registered place and invariant features in association with each other, a similarity calculation step of calculating a similarity with inclusion of a registered place near a selected registered place when the matching is equal to or larger than a specified threshold, and a position identification step of identifying the input image as a registered place when the similarity is equal to or higher than a specified threshold. The feature extraction step includes a local feature extraction step of extracting local features from each input image being sequential images taken sequentially, a feature matching step of performing matching of the local features extracted in the local feature extraction step between the sequential input images, a sequential feature selection step of selecting features matched between the sequential images in the feature matching step as sequential features, and an invariant feature calculation step of calculating invariant features based on the sequential features, and, in the sequential feature selection step, the number of sequential images is variable depending on the number of matched features.

A program according to the present invention causes a computer to execute the above-described position estimation process.

Advantageous Effects of Invention

According to the present invention, it is possible to provide a position estimation device, a position estimation method and a program that can recognize whether the current position is an already registered place or an unregistered place.

DESCRIPTION OF EMBODIMENTS

Embodiments of the present invention are described hereinafter in detail with reference to the drawings. In the following embodiments, the present invention is applied to a position estimation device that estimates a position, which is mounted on a mobile robot device or the like.

First Embodiment of the Present Invention

Figure 1:
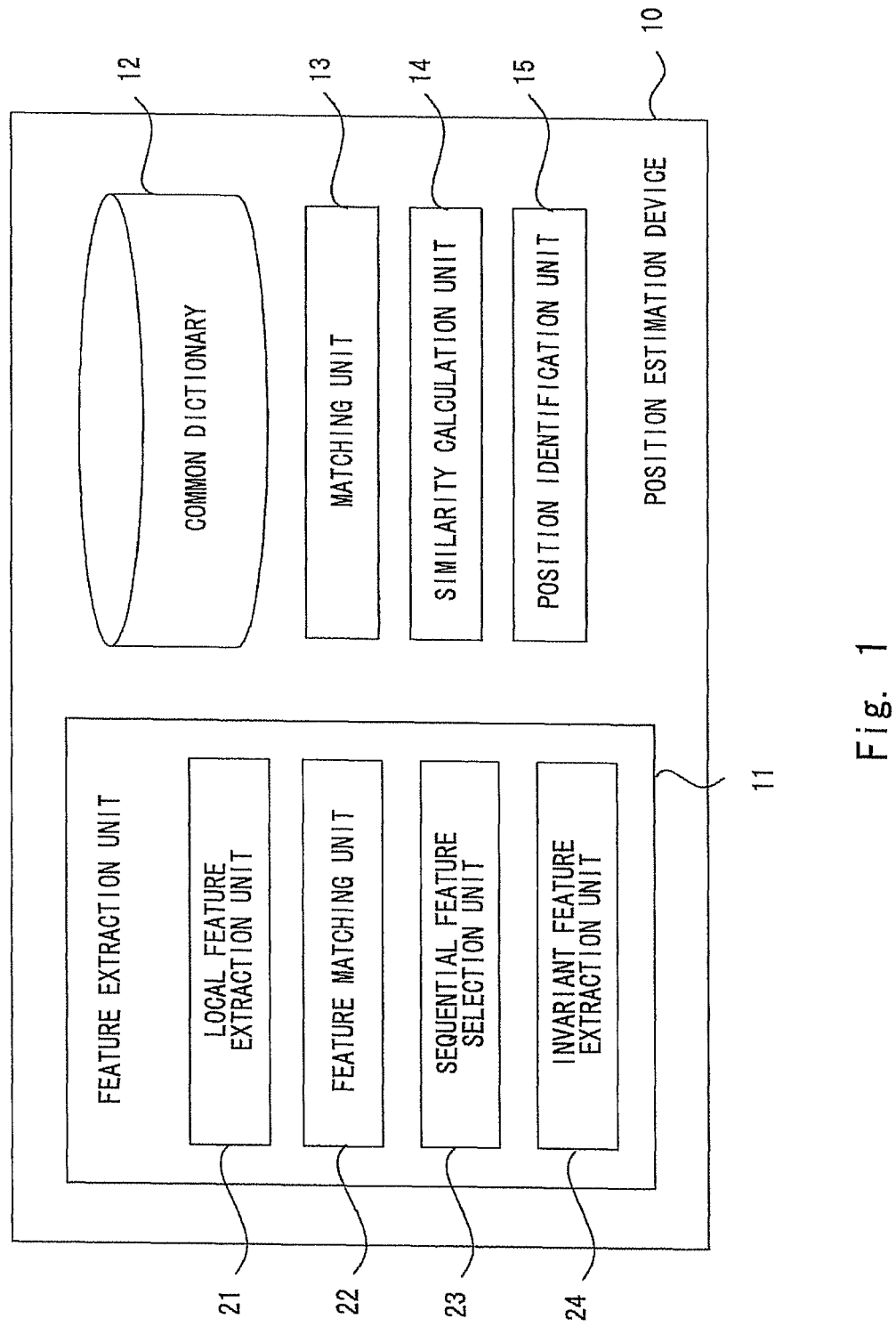
FIG. 1 is a block diagram showing a position estimation device according to an embodiment of the present invention.

FIG. 1 is a block diagram showing a position estimation device according to an embodiment of the present invention. A position estimation device 10 includes a feature extraction unit 11 that extracts invariant features from an input image composed of sequential images taken sequentially, a common dictionary 12, a matching unit 13, a similarity calculation unit 14, and a position identification unit 15. The feature extraction unit 11 includes a local feature extraction unit 21, a feature matching unit 22, a sequential feature selection unit 23, and an invariant feature extraction unit 24.

The local feature extraction unit 21 extracts local features from each of input images. The feature matching unit 22 performs matching of the local features extracted by the local feature extraction unit 21 between sequential input images. The sequential feature selection unit 23 selects features matched between the sequential images by the feature matching unit as sequential features. The invariant feature extraction unit 24 calculates invariant features based on the sequential features. In this embodiment, in the sequential feature selection unit 23, the number of sequential images is variable depending on the number of matched features.

The matching unit 13 obtains matching between an input image and a registered place in reference to a database that contains each registered place and invariant features in association with each other. The similarity calculation unit 14 calculates a similarity with inclusion of a registered place near a selected registered place when the matching is equal to or larger than a specified threshold. The position identification unit 15 identifies the input image as a registered place when the similarity is equal to or higher than a specified threshold.

In the following description, the invariant features extracted by the invariant feature extraction unit 24 are referred to as PIRF (Position-Invariant Robust Features). The feature extraction unit 11 extracts the PIRF as local features that are less vulnerable to a change in image-taking location.

The present inventors have made intensive studies for solving the problem of the self-position estimation of a mobile robot in the real world and consequently found the present method of extracting the PIRF on the ground that, while a difference in appearances (change in features) due to a change in image-taking location or image-taking time period is large for a close object, the change is small for a distant object (features of a landmark do not largely change).

The feature extraction unit 11 according to this embodiment is, when stated simply, performs matching of local features between sequential images, selects sequentially matched features, and extracts and describes local features of the current image, among the local features matched to the selected features, as the PIRF. The number of sequential images is referred to as a window size. As the window size increases, the matched local features decrease and, as the window size decreases, the matched local features increase. In this embodiment, the window size is variable, so that a desired number of PIRFs are obtained.

Figure 2:
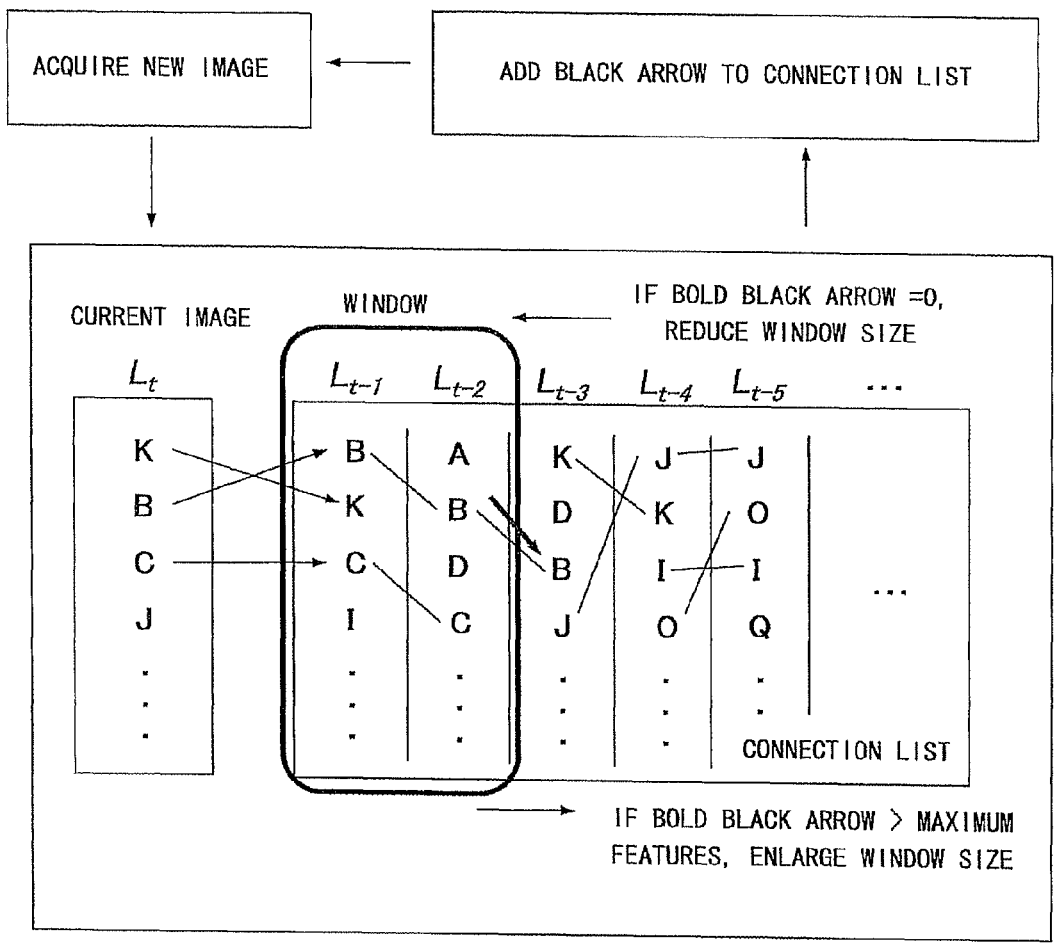
FIG. 2 is a diagram showing a relationship between a window size and PIRF.

FIG. 2 is a diagram showing a relationship between a window size and PIRF. As shown in FIG. 2, it is assumed that the current image $L_t$ contains the local features K, B, C, J, . . . . When the local features of the immediately previous image $L_{t-1}$ to the current image $L_t$ are B, K, C, I, . . . , the local features B, K and C are matched between the two images. Further, when the local features of the immediately previous image $L_{t-2}$ are A, B, D, C, . . . , the matched local features across $L_t$ to $L_{t-2}$ are B and C. If the window size is increased to $L_{t-1}$, $L_{t-2}$ and $L_{t-3}$, the matched local features are only B. In this manner, when the window size is 3, the PIRF is only B. As the window size increases, the number of PIRFs matched across all images decreases and, as the window size decreases, the number of PIRFs increases. Thus, if the number of PIRFs becomes 0, the window size is reduced. On the other hand, if the number of PIRFs is larger than a predetermined maximum number of features, the window size is increased to reduce the number of PIRFs. The local features matched across images are added to a connection list. This eliminates the need to perform matching again at the time of processing the next image.

Note that, although the PIRF may be the average of the local features of each image, the local features of the current image are used as the PIRF in this embodiment. This allows the local features that are matched more closely to the current image to be used as the PIRF. However, the average of all local features may be used as the PIRF according to usage.

Figure 3:
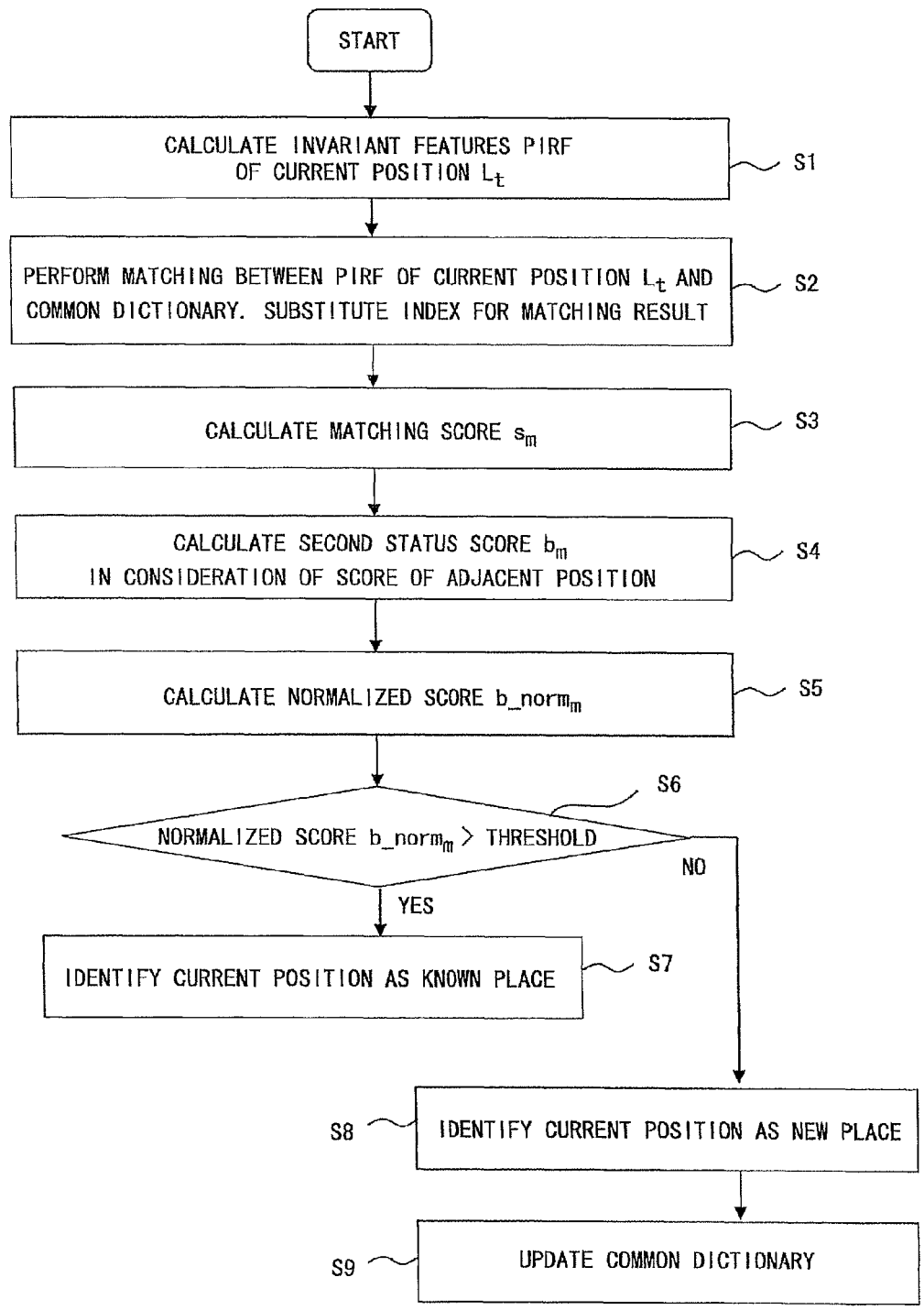
FIG. 3 is a flowchart showing a position estimation method according to an embodiment of the present invention.

A position estimation method according to this embodiment is described hereinbelow. FIG. 3 is a flowchart showing the position estimation method according to this embodiment. As shown in FIG. 3, the feature extraction unit 11 first extracts the invariant features PIRF of the current position $L_t$ (Step S1).

To the local feature extraction unit 21, sequential images that have been taken sequentially are input as an input image. The sequential images requested for the PIRF are a certain set of images, which are video images taken sequentially every second at constant frames, such as two frames per second, for example. Images captured from a video are typically sequential, and the sequential images in the PIRF should be those using video images. The rate of acquiring images is set in accordance with the velocity of a camera. For example, when a camera is mounted on a car, the velocity of a camera is about 1000 meters per minute, and sequential images captured from a video are about 50 to 100 frames per second.

First, the local feature extraction unit 21 extracts local features using a known local feature extraction method. The local feature extraction unit 21 may use features such as SIFT (Scale Invariant Feature Transformation) or SURF (Speed Up Robustness Features), for example. Alternatively, other local features may be used as a matter of course, not limited to the SIFT or SURF. Particularly, it is preferred to use other local features that are robust to scale or rotation changes, noises and the like. By using those local features, the properties of the existing features are maintained, and they can be extracted and described as features robust to changes in illumination or the like.

In this embodiment, the SURF is used. The SIFT extracts 2000 to 3000 features as local features. On the other hand, the SURF extracts 200 to 300 local features, which requires less computing amount. In this embodiment, 100 PIRFs per place are extracted with use of the SURF.

The feature matching unit 22 performs matching of local features between sequential images, an image acquired in the current position and an image acquired just before. When a matching score is equal to or higher than a specified threshold, for example, the local features are considered to be matched.

The sequential feature selection unit 23 determines a window size. In this embodiment, the window size is determined so that the number of invariant features PIRFs is about 100, for example. The invariant feature extraction unit 24 then extracts the local features of the current position, not the average of the local features across sequential images, as the PIRFs.

Figure 4:
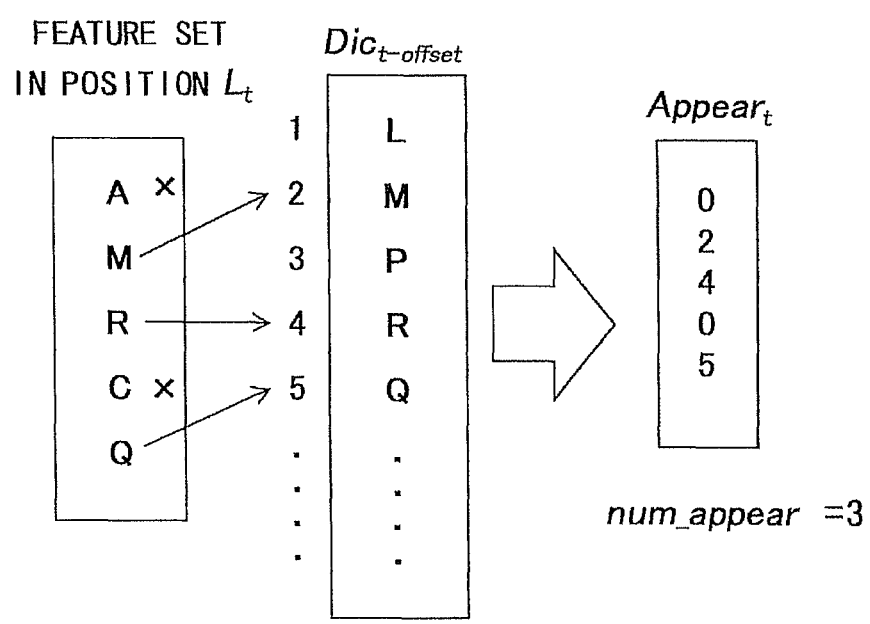
FIG. 4 is a diagram to describe a method for obtaining matching to a common dictionary 12.

Next, matching is obtained between the PIRFs of the current position $L_t$ and the common dictionary 12 (Step S2). FIG. 4 is a diagram to describe a method of obtaining matching to the common dictionary 12. As shown in FIG. 4, it is assumed that the PIRFs of the current position $L_t$ are A, M, R, C and Q. Each alphabet indicates PIRF. In the common dictionary 12, each PIRF is stored in association with an index. Specifically, data indicating that the index 1 is L, the index 2 is M and the like are stored. The matching unit 13 detects a match between the PIRF in the current position $L_t$ and the PIRF in the common dictionary 12 and, when a match is found, substitutes an index for the matched PIRF. When no match is found, the index is set to 0, for example.

After that, a matching score $s_m$ is calculated (Step S3). The matching score $s_m$ is calculated by the following equation.

$$s_m = n_m \times \text{num\_appear} \qquad \text{Equation (1):}$$

"$s_m$" indicates a matching score between a model m and the current position $L_t$. "num_appear" indicates the number of PIRFs matched in the common dictionary 12. In the example of FIG. 4, because three PIRFs M, R and Q are matched, num_appear=3. "$n_m$" indicates the number of PIRFs matched to the model m. For example, if $n_m$=2, $s_m$=2×3=6.

Then, the similarity calculation unit 14 calculates a second status score (first estimated value) $b_m$ in consideration of adjacent positions (Step S4). The features appearing in the current position $L_m$ are likely to appear also in adjacent positions $L_{m-2}$, $L_{m-1}$, $L_{m+1}$ and $L_{m+2}$. Thus, the matching score of these adjacent positions are predicted to be substantially the same as or slightly lower than $s_m$. Accordingly, even though $s_m$ is a high score, if $s_{m-1}$ or $s_{m+1}$ is 0, the matching score is not correct, that is, the position is not estimated.

In this embodiment, the second status score $b_m$ to which a weight is assigned using the Gaussian function $p_t(m,i)$ is calculated by the following equation (2).

Equation (2)

$$b_m = \sum_{i=m-w}^{i=m+w} (s_i \cdot p_t(m, i)) \qquad (2)$$

"w" indicates the number of adjacent positions to be taken into account. For example, in the case where the frame rate is fixed, the value of w may be set to 1 when the speed is high, and the value of w may be set to 2 when the speed is low, for example.

It is possible to determine that the current position coincides with the model m, that is, it is a known place, based on the second status score $b_m$. In this embodiment, however, the rate of identification is further enhanced by normalizing the second status score $b_m$.

A normalized score (second estimated value) $b\_norm_m$ can be calculated by the following equation (3) (Step S5).

Equation (3)

$$b\_norm_m = \frac{\sum_{i=m-w}^{i=m+w} b_i}{2w \cdot n} \quad (3)$$

"n" is a value corresponding to the traveling speed of the position estimation device, and it can be the maximum extraction value obtained in the extraction of PIRFs. The similarity calculation unit 14 calculates the normalized score $b\_norm_m$, and, when the value is higher than a specified threshold, the position identification unit 15 identifies the current position as a match for the model m, that is, as a known place (Steps S6 and S7). For example, when the current position coincides with the model (place) m, the PIRF of the place m is updated by adding the PIRF that has not been contained in the original place m to the place m. At this time, because the features of each place are stored as indexes, it is only necessary to increase the index, which prevents a significant increase in memory volume. Further, if the First-in, First-out method is used, for example, the update of the PIRF of the place m does not cause an increase in memory volume.

On the other hand, when the normalized score $b\_norm_m$ is less than a specified threshold, the position identification unit 15 identifies the current position as a new place (Step S8) and registers the PIRF extracted in the current position into the common dictionary 12.

In this embodiment, the common dictionary 12 is used. Specifically, by using a dictionary common to all places rather than preparing a dictionary in each place, the memory volume can be significantly reduced. By using the FIFO method in the common dictionary 12 as well, an increase in memory volume can be prevented.

The advantageous effects of the present invention are described hereinafter using examples to which the embodiment is applied in practice.

1. City Centur Dataset

Figure 5:
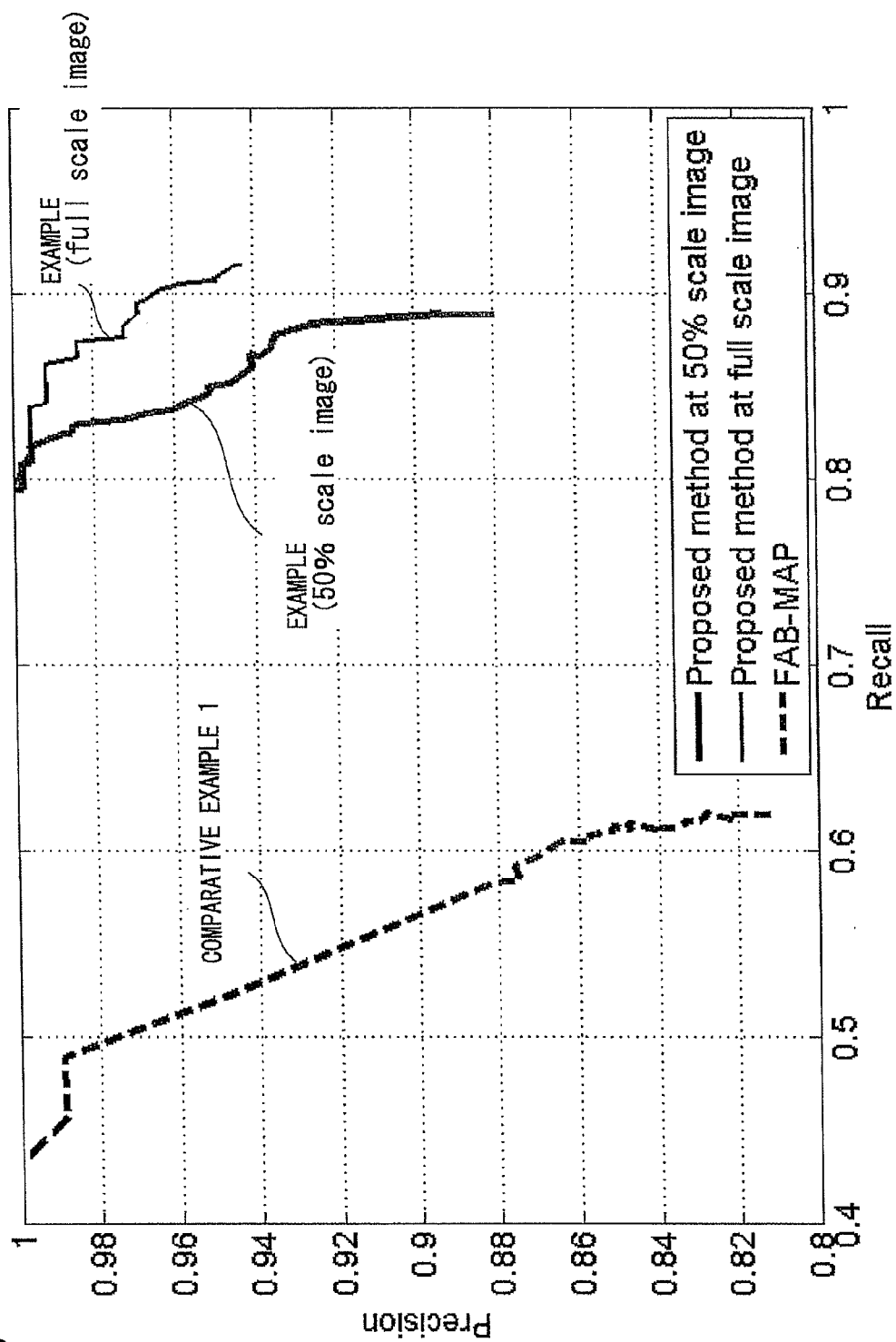
FIG. 5 is a graph showing a recognition result in the case of using City Centre dataset.

The City Centre dataset is a dataset collected by Cummins and Newman (M. Cummins and P. Newman, "Highly Scalable Appearance-Only SLAM-FAB-MAP 2.0", Proc. Robotics: Sciences and Systems (RSS), 2009). The dataset is composed of data of 2474 images taken every 1.5 meter in 1237 locations (each image on the left and right) by a stereo camera. Table 1 shows the rate of recognition, and FIG. 5 is a graph showing a recognition result. The rate of recognition of this example is significantly higher than that of FAB-MAP. In Table 1, Recall is the percentage that the system has made an answer (percentage that a position is recognized as a known place), and Precision indicates the percentage of correct answers. Further, Total Time indicates the time taken for recognition. In each result, remarkable values are presented in this example.

TABLE 1

| Method | Recall | Precision | False Positive | Total Time (Sec) |
|---|---|---|---|---|
| Example | 80.03% | 100% | 0 | 1086.4 |
| Comp. Example 1 | 43.23% | 100% | 0 | 577 |
| Comp. Example 2 | 23.89% | 97.76% | 2 | 7200 |

Note that the comparative example 1 is FAB-MAP (M. Cummins and P. Newman, "Highly Scalable Appearance-Only SLAM-FAB-MAP 2.0", Proc. Robotics: Sciences and Systems (RSS), 2009), and the comparative example 2 is Fast and incremental BOWs (A. Angeli, D. Filliat, S. Soncieux, and J. A. Mayer, "Fast Ubcrenabtak Nethid for Loop-Closure Detection Using Bags of Visual Wird, "IEEE Trans. Rovotics, 2008, 24(5), pp.1027-1037).

2. Lip6Indoor Dataset

Another example is an example using Indoor dataset. The dataset is composed of 318 images collected every second. Table 2 shows the result of recognition. Although the present example has made one false recognition, it has achieved good results compared to the others.

TABLE 2

| Method | Recall | Precision | False Positive | Total Time (Sec) |
|---|---|---|---|---|
| Example | 77.73% | 99.42% | 1 | 32.84 |
| Comp. Example 1 | 23.64% | 100% | 0 | 187.16 |
| Comp. Example 2 | 68% | 100% | 0 | 99 |

3. Crowded University Canteen Data

Figure 6:
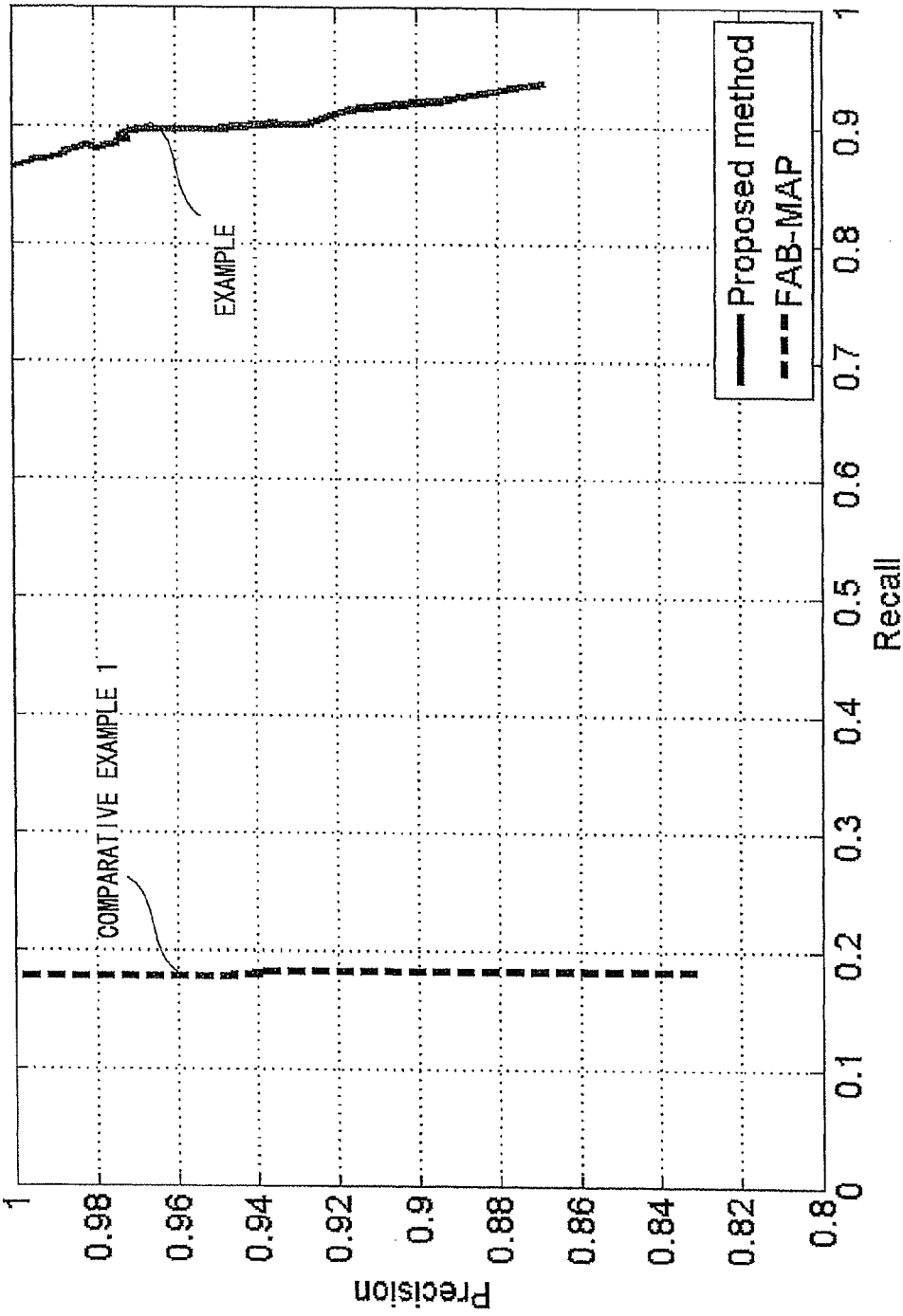
FIG. 6 is a graph showing a recognition result in the case of using Crowded University canteen data.

Yet another example is one using data obtained by taking images of a space with motions, which is considered as the most difficult case. The data is obtained by taking 692 images with the size of 270×480 in 692 locations at the rate of two frames per second, using an omnidirectional camera. Table 3 shows the rate of recognition, and FIG. 6 is a graph showing a recognition result. Note that, regarding the comparative example 2, the inventor has sent the dataset to France and receives the experimental result of the comparative example 2 back.

TABLE 3

| Method | Recall | Precision | False Positive | Total Time (Sec) |
|---|---|---|---|---|
| Example | 86.65% | 100% | 0 | 264.12 |
| Comp. Example 1 | 17.80% | 100% | 0 | 577 |
| Comp. Example 2 | 1.01% | 100% | 0 | 2807 |

The dataset is obtained by taking images in the environment of a crowded university dining hall for the first time in the world, and, even in such an environment with many variable factors (where many people are moving), a significantly high recognition rate is achieved in this example. Although the recognition in such an environment with many variable factors is substantially impossible in the comparative examples 1 and 2, the position can be estimated at the rate of about 87% in this example.

Other Embodiments of the Present Invention

As described above, according to the present invention, self-position identification can be made from images, and online update of a dictionary can be done. Thus, a combination with the video taking function of a mobile phone allows the following applications, for example.

When a user gets lost in a department store, shopping mall or the like, the user takes an image of the surrounding scenery quickly with a mobile phone and sends the captured image to the server. The server analyzes the image and can thereby return an answer as to where it is, and, additionally, what facilities and shops are around and the like.

The GPS is not available indoors. On the other hand, in this embodiment, a search video sent from a user is used also as data for updating a dictionary or map. Therefore, the update of a dictionary and map can be made at all times. Note that, in an existing car navigation system or the like, the update of map data is basically unavailable or it takes a considerable effort and time.

Because there are base stations that manage a service area on a shared basis in a mobile phone network, each base station can simply have the map of the part where it is in charge of and update it. Therefore, an enormous dictionary is not needed, and the memory and computing speed can be significantly cut down. It is highly likely that a wearable vision (camera) such as eyeglasses will make its debut, and it is possible for such eyeglasses to always identify the self-position and present useful information.

The present invention is not limited to the above-described exemplary embodiments, and various changes may be made without departing from the spirit and scope of the present invention.

For example, although the present invention is described as a hardware configuration in the above embodiments, the present invention is not limited thereto. The present invention may be implemented by causing a CPU (Central Processing Unit) to execute a computer program to perform a given process. In this case, the computer program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

This application is based upon and claims the benefit of priority from Japanese patent application No. 2010-115307, filed on May 19, 2010, the disclosure of which is incorporated herein in its entirety by reference.

INDUSTRIAL APPLICABILITY

The present invention is suitably applicable to a position estimation device, a position estimation method and a program that can be used for a robot device and the like.

REFERENCE SIGNS LIST

10 POSITION ESTIMATION DEVICE
11 FEATURE EXTRACTION UNIT
12 COMMON DICTIONARY
13 MATCHING UNIT
14 SIMILARITY CALCULATION UNIT
15 POSITION IDENTIFICATION UNIT
21 LOCAL FEATURE EXTRACTION UNIT
22 FEATURE MATCHING UNIT
23 SEQUENTIAL FEATURE SELECTION UNIT
24 INVARIANT FEATURE EXTRACTION UNIT

The invention claimed is:
1. A position estimation device comprising:
a feature extraction means for extracting invariant features from an input image;
a matching means for obtaining matching between an input image and a registered place in reference to a database containing each registered place and invariant features in association with each other;
a similarity calculation means for calculating a similarity with inclusion of a registered place near a selected registered place when the matching is equal to or larger than a specified threshold; and
a position identification means for identifying the input image as a registered place when the similarity is equal to or higher than a specified threshold, wherein
the feature extraction means includes
a local feature extraction means for extracting local features from each input image being sequential images taken sequentially,
a feature matching means for performing matching of the local features extracted by the local feature extraction means between the sequential input images based on matching scores of the sequential input images,
a sequential feature selection means for selecting the local features matched between the sequential images by the feature matching means as sequential features, and
an invariant feature calculation means for calculating invariant features based on the sequential features, and
the sequential feature selection means sets the number of sequential images to be variable depending on the number of matched features.

2. The position estimation device according to claim 1, wherein the matching means includes a common dictionary containing each features registered in association with an index and performs matching by substituting an index for local features of each input image in reference to the common dictionary.

3. The position estimation device according to claim 2, wherein the matching means calculates a matching score based on a product of the number of matches to features registered in the common dictionary and the number of matches to features contained in a matching target image.

4. The position estimation device according to claim 1, wherein
the similarity calculation means calculates a first estimated value by assigning a weight to a matching score of the selected registered place and the near registered place, and
the position identification means identifies whether the place is a registered place using the first estimated value as the similarity.

5. The position estimation device according to claim 1, wherein
the similarity calculation means calculates a second estimated value by normalizing the first estimated value, and
the position identification means identifies whether the place is a registered place using the second estimated value as the similarity.

6. The position estimation device according to claim 1, wherein the local features are SIFT (Scale Invariant Feature Transformation) and/or SURF (Speed Up Robustness Features).

7. A position estimation method comprising:
a feature extraction step of extracting invariant features from an input image;
a matching step of obtaining matching between an input image and a registered place in reference to a database containing each registered place and invariant features in association with each other;

a similarity calculation step of calculating a similarity with inclusion of a registered place near a selected registered place when the matching is equal to or larger than a specified threshold; and a position identification step of identifying the input image as a registered place when the similarity is equal to or higher than a specified threshold, wherein the feature extraction step includes a local feature extraction step of extracting local features from each input image being sequential images taken sequentially, a feature matching step of performing matching of the local features extracted in the local feature extraction step between the sequential input images based on matching scores of the sequential input images, a sequential feature selection step of selecting the local features matched between the sequential images in the feature matching step as sequential features, and an invariant feature calculation step of calculating invariant features based on the sequential features, and in the sequential feature selection step, the number of sequential images is variable depending on the number of matched features.

8. The position estimation method according to claim 7, wherein the matching step performs matching by substituting an index for local features of each input image in reference to a common dictionary containing each feature registered in association with an index.

9. The position estimation method according to claim 8, wherein the matching step calculates a matching score based on a product of the number of matches to features registered in the common dictionary and the number of matches to features contained in a matching target image.

10. The position estimation method according to claim 7, wherein the similarity calculation step calculates a first estimated value by assigning a weight to a matching score of the selected registered place and the near registered place, and the identification step identifies whether the place is a registered place using the first estimated value as the similarity.

11. The position estimation method according to claim 7, wherein the similarity calculation step calculates a second estimated value by normalizing the first estimated value, and the identification step identifies whether the place is a registered place using the second estimated value as the similarity.

12. The position estimation method according to claim 7, wherein the local features are SIFT (Scale Invariant Feature Transformation) and/or SURF (Speed Up Robustness Features).

13. A program on a non-transitory computer readable medium causing a computer to execute a specified operation comprising:

a feature extraction step of extracting invariant features from an input image;

a matching step of obtaining matching between an input image and a registered place in reference to a database containing each registered place and invariant features in association with each other;

a similarity calculation step of calculating a similarity with inclusion of a registered place near a selected registered place when the matching is equal to or larger than a specified threshold; and a position identification step of identifying the input image as a registered place when the similarity is equal to or higher than a specified threshold, wherein the feature extraction step includes a local feature extraction step of extracting local features from each input image being sequential images taken sequentially, a feature matching step of performing matching of the local features extracted in the local feature extraction step between the sequential input images based on matching scores of the sequential input images, a sequential feature selection step of selecting the local features matched between the sequential images in the feature matching step as sequential features, and an invariant feature calculation step of calculating invariant features based on the sequential features, and in the sequential feature selection step, the number of sequential images is variable depending on the number of matched features.

\* \* \* \* \*